US011760182B2

(12) United States Patent
Spielvogel et al.

(10) Patent No.: US 11,760,182 B2
(45) Date of Patent: Sep. 19, 2023

(54) BATTERY STRUCTURE AND PROTECTOR

(71) Applicant: Mubea Carbo Tech GmbH, Salzburg (AT)

(72) Inventors: Bernhard Spielvogel, Moosbach (AT); Sebastian Schmitz, Salzburg (AT); Guido Insam, Kalsdorf (AT); Herbert Dorfinger, Zell am Moos (AT)

(73) Assignee: MUBEA CARBO TECH GMBH, Salzburg (AT)

( * ) Notice: Subject to any disclaimer, the term of this patent is extended or adjusted under 35 U.S.C. 154(b) by 0 days.

(21) Appl. No.: 17/315,602

(22) Filed: May 10, 2021

(65) Prior Publication Data

US 2021/0260978 A1 Aug. 26, 2021

Related U.S. Application Data

(63) Continuation of application No. 16/486,387, filed as application No. PCT/EP2018/053354 on Feb. 9, 2018, now Pat. No. 11,034,227.

(30) Foreign Application Priority Data

Feb. 17, 2017 (CH) ..................................... 00186/17

(51) Int. Cl.
*H01M 4/02* (2006.01)
*B60K 1/04* (2019.01)
(Continued)

(52) U.S. Cl.
CPC ................ *B60K 1/04* (2013.01); *B60L 50/64* (2019.02); *B60L 50/66* (2019.02); *B60L 58/26* (2019.02); *B60L 58/27* (2019.02); *H01M 10/613* (2015.04); *H01M 10/625* (2015.04); *H01M 10/647* (2015.04); *H01M 10/6556* (2015.04); *H01M 50/204* (2021.01); *B60K 2001/005* (2013.01); *B60K 2001/0438* (2013.01);
(Continued)

(58) Field of Classification Search
CPC ....................................................... H01M 4/02
See application file for complete search history.

(56) References Cited

U.S. PATENT DOCUMENTS 6,706,365 B2 3/2004 Akasaka et al.
9,331,321 B2 5/2016 Berger et al.
(Continued)

FOREIGN PATENT DOCUMENTS

CN 101353061 A 1/2009
CN 102029747 A 4/2011
(Continued)

OTHER PUBLICATIONS

Chinese Search Report for Chinese application No. 2018800113311 dated Aug. 11, 2022.
(Continued)

*Primary Examiner* — Jacob B Marks
(74) *Attorney, Agent, or Firm* — GrowIP Law Group LLC

(57) ABSTRACT

The present disclosure relates to a battery structure for an electric vehicle. The battery structure comprises a battery case for at least one battery module and a protector including a top belt, a bottom belt and a core arranged between and interconnecting the top belt and the bottom belt. The top belt has a wavelike cross section.

23 Claims, 4 Drawing Sheets

(51) Int. Cl.
*H01M 10/613* (2014.01)
*H01M 10/625* (2014.01)
*H01M 10/647* (2014.01)
*H01M 10/6556* (2014.01)
*B60L 58/27* (2019.01)
*B60L 50/64* (2019.01)
*B60L 50/60* (2019.01)
*B60L 58/26* (2019.01)
*H01M 50/204* (2021.01)
*B60K 1/00* (2006.01)

(52) U.S. Cl.
CPC ....... *B60Y 2306/01* (2013.01); *B60Y 2306/05* (2013.01); *H01M 2220/20* (2013.01)

(56) References Cited

U.S. PATENT DOCUMENTS

| | | | |
|---|---|---|---|
| 2007/0132278 | A1 | 6/2007 | Lester et al. |
| 2010/0119927 | A1* | 5/2010 | Bauer ............. H01M 50/291 429/120 |
| 2012/0079859 | A1* | 4/2012 | Lakamraju ......... E05B 17/0075 70/277 |
| 2012/0103714 | A1 | 5/2012 | Choi et al. |
| 2012/0160088 | A1 | 6/2012 | Rawlinson |
| 2012/0183828 | A1 | 7/2012 | van den Akker |
| 2014/0302279 | A1 | 10/2014 | Pfaffelhuber et al. |
| 2015/0135939 | A1 | 5/2015 | Rawlinson |
| 2015/0135940 | A1 | 5/2015 | Rawlinson |
| 2015/0147618 | A1* | 5/2015 | Nakamori ............... B60K 1/04 429/96 |
| 2015/0180078 | A1 | 6/2015 | Ikeda et al. |
| 2015/0336452 | A1 | 11/2015 | Decker |
| 2016/0043365 | A1* | 2/2016 | Vogel ............... H01M 10/647 429/99 |
| 2016/0272246 | A1 | 9/2016 | Berger et al. |
| 2016/0288737 | A1 | 10/2016 | Kamimura et al. |
| 2017/0001507 | A1 | 1/2017 | Ashraf et al. |
| 2017/0036524 | A1 | 2/2017 | Ikeda et al. |

FOREIGN PATENT DOCUMENTS

| | | |
|---|---|---|
| CN | 102468454 A | 5/2012 |
| CN | 103730616 A | 4/2014 |
| CN | 104835991 A | 8/2015 |
| CN | 104884288 A | 9/2015 |
| CN | 103119766 B | 4/2016 |
| CN | 105829191 A | 8/2016 |
| CN | 206076329 U | 4/2017 |
| CN | 105591119 B | 9/2018 |
| DE | 1778627 A1 | 8/1971 |
| DE | 19702581 A1 | 8/1997 |
| DE | 102010024320 A1 | 12/2011 |
| DE | 102010050826 A1 | 5/2012 |
| DE | 102012017879 A1 | 3/2014 |
| DE | 202014104104 U1 | 9/2014 |
| DE | 102015110137 A1 | 1/2016 |
| DE | 102015101096 A1 | 7/2016 |
| DE | 102015201294 A1 | 7/2016 |
| DE | 112016002474 | 2/2018 |
| EP | 0255749 A1 | 2/1988 |
| EP | 2196308 A1 | 6/2010 |
| EP | 2623353 A1 | 8/2013 |
| EP | 2650946 A1 | 10/2013 |
| EP | 2910394 A1 | 8/2015 |
| EP | 2715835 B1 | 12/2016 |
| EP | 3182503 A1 | 6/2017 |
| JP | H07101334 A | 4/1995 |
| JP | 2008056194 A | 3/2008 |
| JP | 2014080116 A | 5/2014 |
| JP | 2014108757 A | 6/2014 |
| WO | 2013020707 A2 | 2/2013 |
| WO | 2014188259 A1 | 11/2014 |
| WO | 2017207503 A1 | 12/2017 |

OTHER PUBLICATIONS

International Search Report (ISR) and Written Opinion for PCT/EP2018/053354 dated May 17, 2018, pp. 1-12.
Observation by third parties concerning EP 3 582 989 application (Art. 115 EPC), Mar. 2, 2020.
English translation of Chinese Search Report for Chinese Patent Application 201880011331.1, dated Dec. 28, 2021.
Arora, S. et al. Review of mechanical design and strategic placement technique of a robust battery pack for electric vehicles. Renewable and Sustainable Energy Reviews, 60 (2016) 1319-1331.
Butz J. et al., Design and dimensioning of molded parts and profiles made of GF-UP including too-bound surface design. CIP-recording of the German Library, Dusseldorf (1980), VDI-Verlag GmbH.
Duden—vol. 10: The dictionary of meanings. Essential for expanding vocabulary, p. 354 (1970).
Friedrich, H. von K. Composite Materials and Material Composites. Informationsgesellschaft Verlag. pp. 96-99, 468-469, 472-481; Germany (1977).
Kohler, Dr. E. and Dr. A. Bergner. Fiber Composite Construction. Chemnitz University of Technology, faculty for mechanical and process engineering. Institute for General Mechanical Engineering and Plastics Technology, pp. 42-43 (1998).
Marshall, I.H., Composite Structures, Applied Science Publishers, Ltd. Ch. 32; 475, 478-483 (1981).
Paus, T. et al. Fachkunde Kunststofftechnik: Lernfelder 1 bis 14. Europa Lehrmittel. pp. 432-33, 568-569 (2010).
Schlichting, J. Verbundwerkstoffe. Kontact+Studium Lexika, pp. 195, 202-203 (1978).
Trzesniowski, M. Racing Car Technology. Basis, construction, components, systems. Vieweg+Teubner Verlag, pp. 762-769, 780-781 (2008).
Wikipedia. Antriebsbatterie. https://de.wikipedia.org/w/index.php?title=Antriebsbatterie&oldid=162246715 (Feb. 2, 2017).
Wikipedia. Fluid. https://de.wikipedia.org/w/index.php?title=Fluid&oldid=162789261 (Feb. 19, 2017).
Wikipedia. Fluid. https://en.wikipedia.org/w/index.php?title=Fluid&oldid=761999454, (Jan. 26, 2017).
Wikipedia. Gehause (Housing). https://de.wikipedia.org/w/index.php?title=Geh%C3%A4use&oldid=1 (Apr. 12, 2017).
Wikipedia. Sandwich (Begriffsklarung). https://de.wikipedia.org/w/index.php?title=Sandwich_(Begriffsklarung)&oldid=163641539, Mar. 16, 2017.
Wikipedia. Sandwich panel. https://en.wikipedia.org/w/index.php?title=Sandwich_panel&oldid=757141350 (Dec. 29, 2016).

* cited by examiner

BATTERY STRUCTURE AND PROTECTOR

CROSS-REFERENCE TO RELATED APPLICATIONS

This is a continuation application that claims the benefit of the filing date of U.S. Non-Provisional application Ser. No. 16/486,387, filed on Aug. 15, 2019, that claims priority to international PCT Application No. PCT/EP2018/053354, filed on Feb. 9, 2018, that in turn claims priority to Swiss Patent Application No. CH 00186/17, filed on Feb. 17, 2017, which are hereby incorporated by reference in their entirety.

FIELD OF THE INVENTION

The present disclosure relates to a battery structure for an electric vehicle and a protector for a battery pack.

BACKGROUND OF THE INVENTION

DE102015101096A1 was first published in July 2016 in the name of Porsche AG. It relates to a battery structure. The battery facilities include an underbody battery between a bottom plate and a floor. At least one deformation zone is foreseen to avoid unwanted damage to a battery of the underbody. The deformation zone is below the battery facilities. The bottom plate can deform upwards.

WO15077000A1 was first published in May 2015 in the name of Atieva Inc. It relates to a battery pack protection system for use with an electric vehicle in which the battery pack is mounted under the car. The system utilizes a plurality of deformable cooling conduits located between the lower surface of each of the batteries and the lower battery pack enclosure panel. A thermal insulator is interposed between the conduits and the lower enclosure panel. A layer of thermally conductive material may be included which is interposed between the cooling conduits and the thermal insulator and in contact with a lower surface of each of the cooling conduits.

The cooling conduits are configured to deform and absorb impact energy when an object, such as road debris, strikes the lower surface of the lower battery pack enclosure panel. Further protection may be achieved by positioning a ballistic shield, alone or with a layer of compressible material, under the bottom surface of the battery pack.

FR2977554A was first published in January 2013 in the name of Fior Concept. It relates to a vehicle having a frame which comprises a honeycomb shaped structure that forms a plate. A surface of an upper plate is rigidly connected to an upper surface of the plate. A surface of a bottom plate is rigidly connected to a lower surface of the plate. Resistant structures are protruded above a wheel notch and attached with the notch by a complete and rigid connection. An external resistant belt is attached with an external circumference of the plate by the complete and rigid connection and placed partially between the structures of passages of the wheels.

SUMMARY OF THE INVENTION

From the prior art, parts for the protection of battery packs arranged in the vehicle floor are known which often absorb the occurring energy by plastic deformation over a relatively large deformation path. The protectors known from the prior art are either made from metal or composite material and are not appropriate for absorbing high punctual impact loads.

One disadvantage of the systems known from the prior art is that a significant amount of space between the underride protection and the parts to be protected is consumed as the structure used to fulfill the requirements, i.e. depleting of the introduced energy without significant introduction of forces into the parts to be protected. Depending on the type of vehicle this can have a significant impact on at least one of the following parameters: Ground clearance, access height, head clearance, vehicle height, cross-sectional area.

Therefore, it is an object of the present disclosure to provide an improved protector for a battery structure which offers better performance for protecting of a battery structure in an underfloor of an electric vehicle, namely high local stress, e.g. due to impact by an immersible traffic bollard. It is a further object to provide a protector which is lighter and needs less space in height direction to deplete the occurring energy by elastic and/or plastic deformation.

The protector according to the present disclosure helps to prevent damage of at least one battery module arranged in an underfloor of an electric car. The protector normally comprises a top belt and a bottom belt and a there between arranged core interconnecting the top belt and the bottom belt. The top belt preferably has a waveform in at least one direction. Depending on the field of application, the waveform may extend in two directions arching from one beam to another beam effectively receiving and distributing high local load as described hereinafter in more detail. The protector according to the present disclosure offers optimized distribution of the occurring energy into the structure by a combination of elastic and/or plastic deformation. The top belt and the bottom belt, as well as the there-between arranged core, are preferably made from at least one out of the following group of materials: Aluminum, steel, fiber reinforced composite material, thermoplastic material.

In a preferred variation the top belt is made from aluminum and/or steel and/or thermoplastic material comprising short fibers, while the bottom belt is preferably made from fiber reinforced composite material comprising continuous fibers. The core is preferably made from honeycomb and/or foam. Depending on the field of application, other combinations can be used.

A preferred selection of parameters to optimize the structure are: Shape of the cross-section of the wave, shape (curvature) of the wave, core material, chamber height, wall thickness, belt material.

In a preferred variation the battery structure for an electric vehicle comprises a battery case encompassing at least one battery module and a protector. The protector comprises a top belt and a bottom belt and a core arranged between and interconnecting the top belt and the bottom belt. The top belt preferably has a wavelike cross-section extending in at least one direction. The wavelike cross-section of the top belt may extend in longitudinal and/or transverse direction of the electric vehicle resulting in a wavelike top belt, wherein the waves extend in one and/or two directions simultaneously. The waves can be regular or irregular. The waves of the top belt can extend in two directions if appropriate.

The protector is preferably interconnected to at least longitudinal and/or at least one transverse beam of the battery case. In a variation the longitudinal and the transverse beams are arranged grid-like. The top belt can be interconnected to a frame of the battery case. The protector is preferably arranged below a lower sled wall of the battery case housing with the at least one battery module inside. One aim is that the risk that an impacting object can reach the lower sled wall is significantly reduced.

The top belt comprises, with respect to the core, elevations (thicker areas of core) and thereto alternating depressions (thinner area of core) arranged in a wavelike structure. The depressions and elevations span across the beams, respectively the frame of the battery case, in an arch-like manner resulting in a very efficient structure, especially in the case of punctual loads occurring from the outside (opposite side of the protector). The top belt in the area of at least one depression can be directly interconnected to the bottom belt. The top belt in the area of at least one depression can be directly connected to the bottom belt. Alternatively or in addition, the top belt can be in the area of at least one depression indirectly connected to the bottom belt, e.g. via a section of the same or a different core. Good results can be achieved if the core is a honeycomb, e.g. made from aluminum, steel or injection molded thermoplastic material, and/or a foam. The bottom belt preferably has a primarily flat structure, especially in the case that it provides the outer layer of the underfloor. Stiffening corrugations may be applied if necessary as part of the structure and/or as separate elements. The core can be made from an isolating material. If appropriate at least one of the depressions can be used for conveying of a fluid for cooling and/or heating of the at least one battery module.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

BRIEF DESCRIPTION OF THE DRAWINGS

The herein described invention will be more fully understood from the detailed description given herein below and the accompanying drawings which should not be considered limiting to the invention described in the appended claims. The drawings are showing:

DESCRIPTION OF THE EMBODIMENTS

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Figure 1:
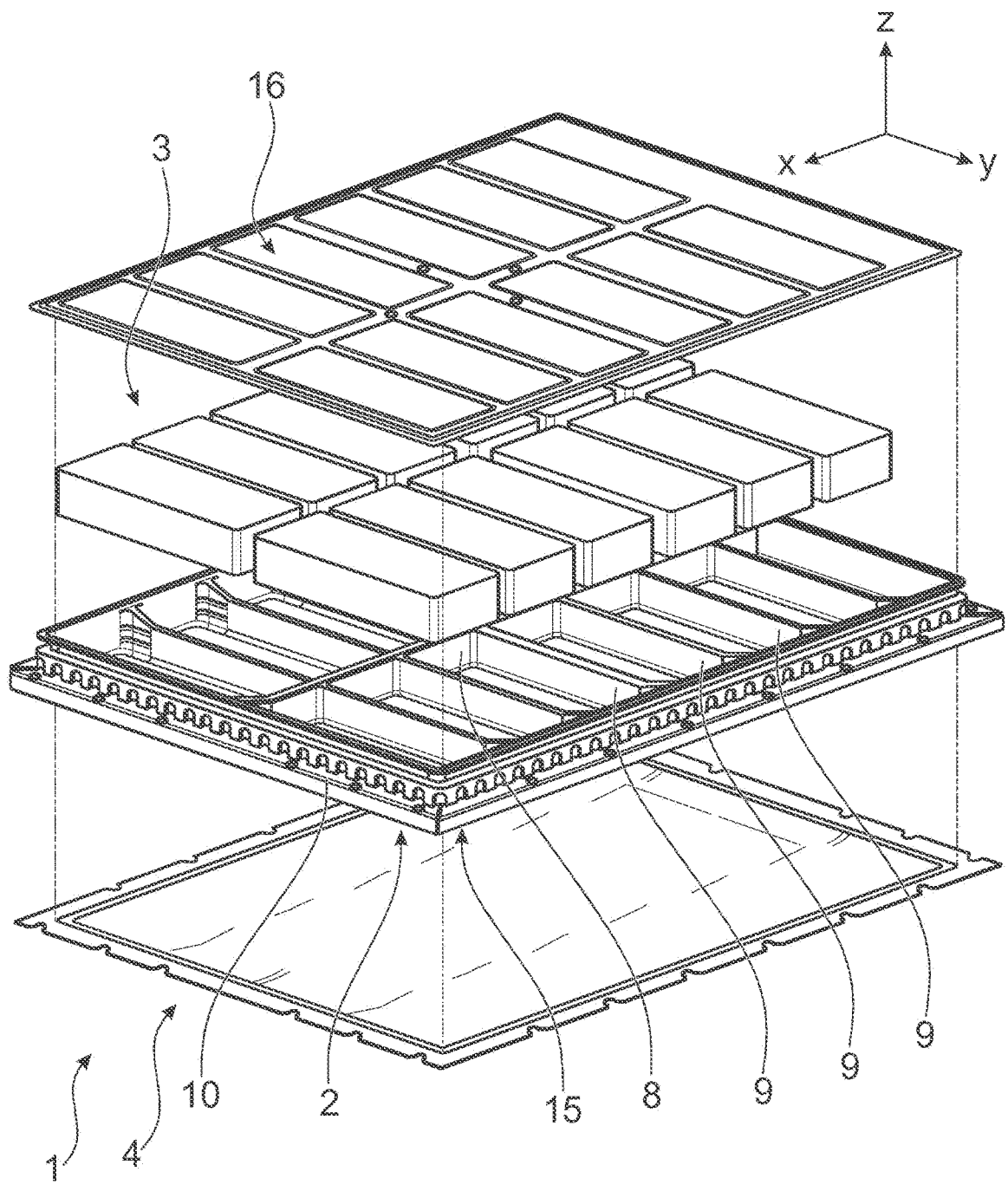
FIG. 1 a battery structure according to the present disclosure.
Figure 2:
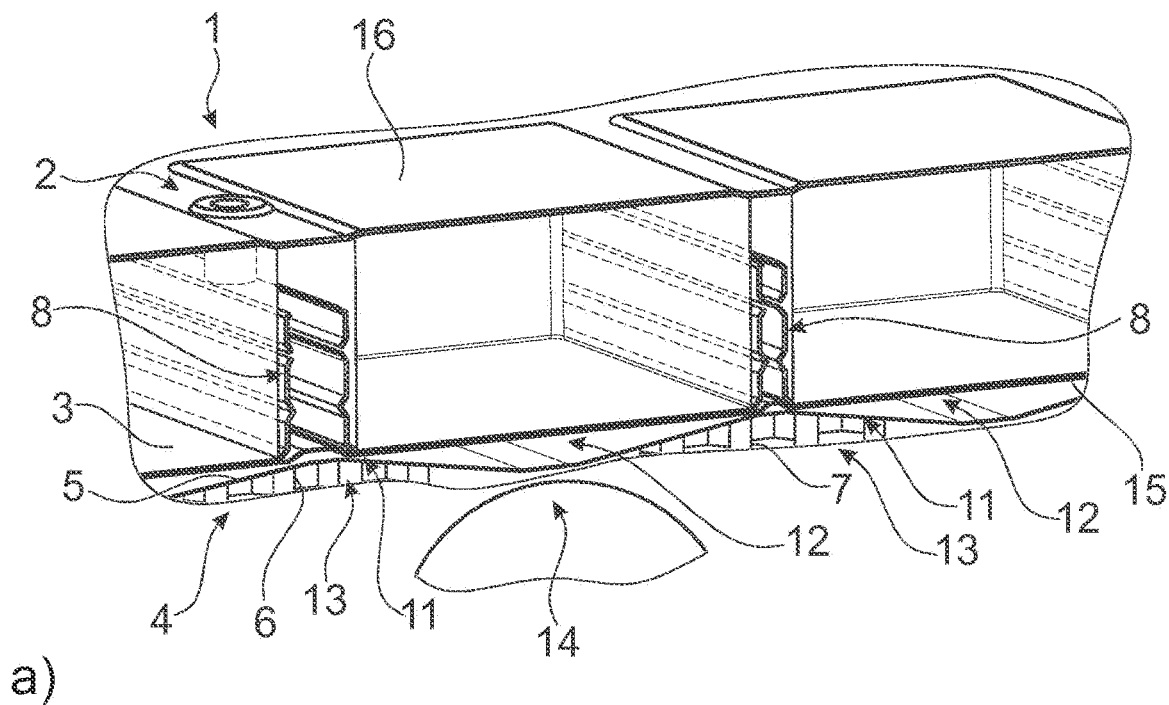
FIG. 2 a longitudinal and a transverse section view across a battery case according to the present disclosure.
Figure 2:
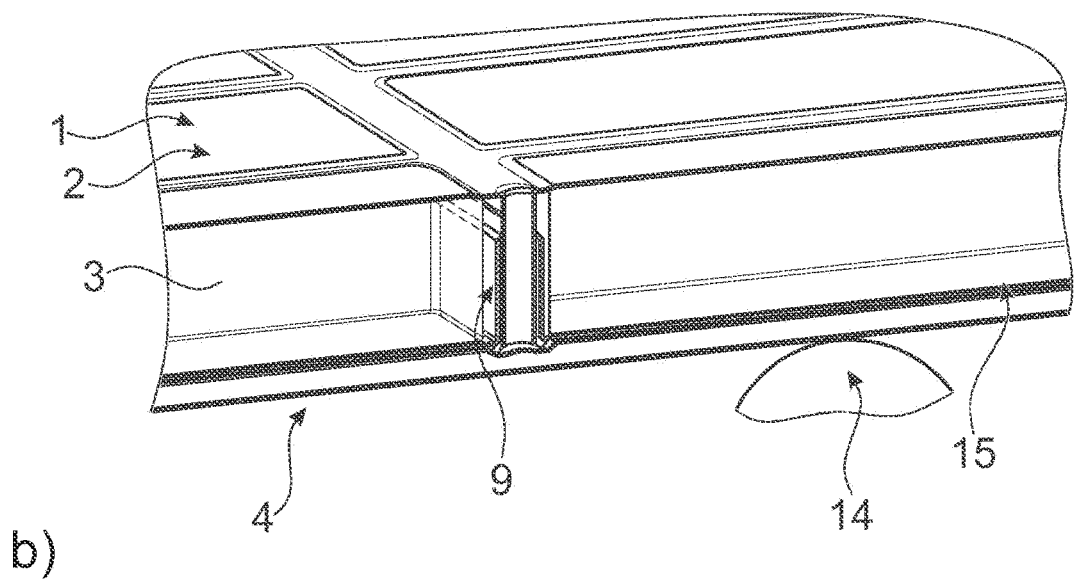
Figure 3:
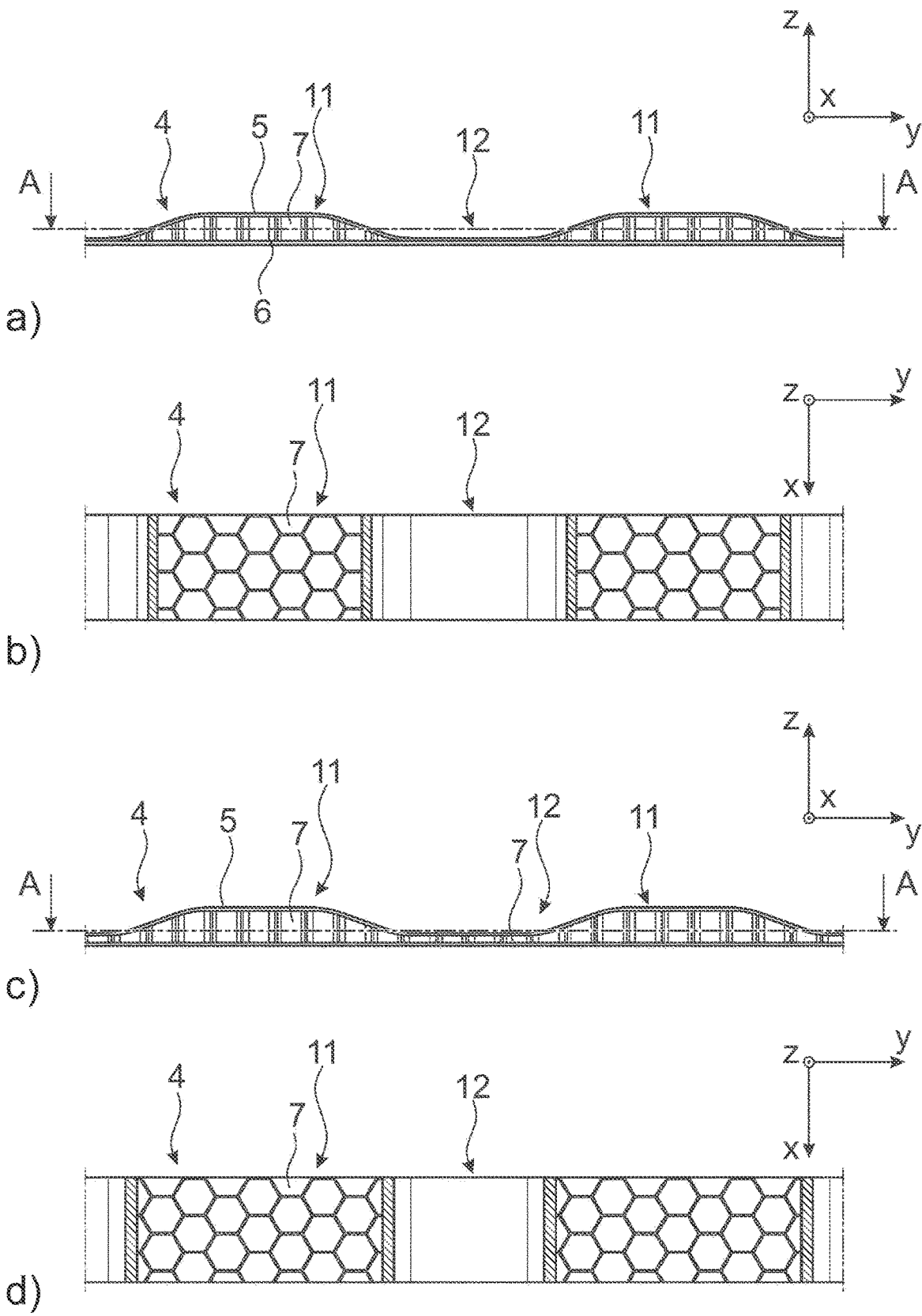
FIG. 3 a first and a second embodiment of a protector in a first and in a second section view.
Figure 4:
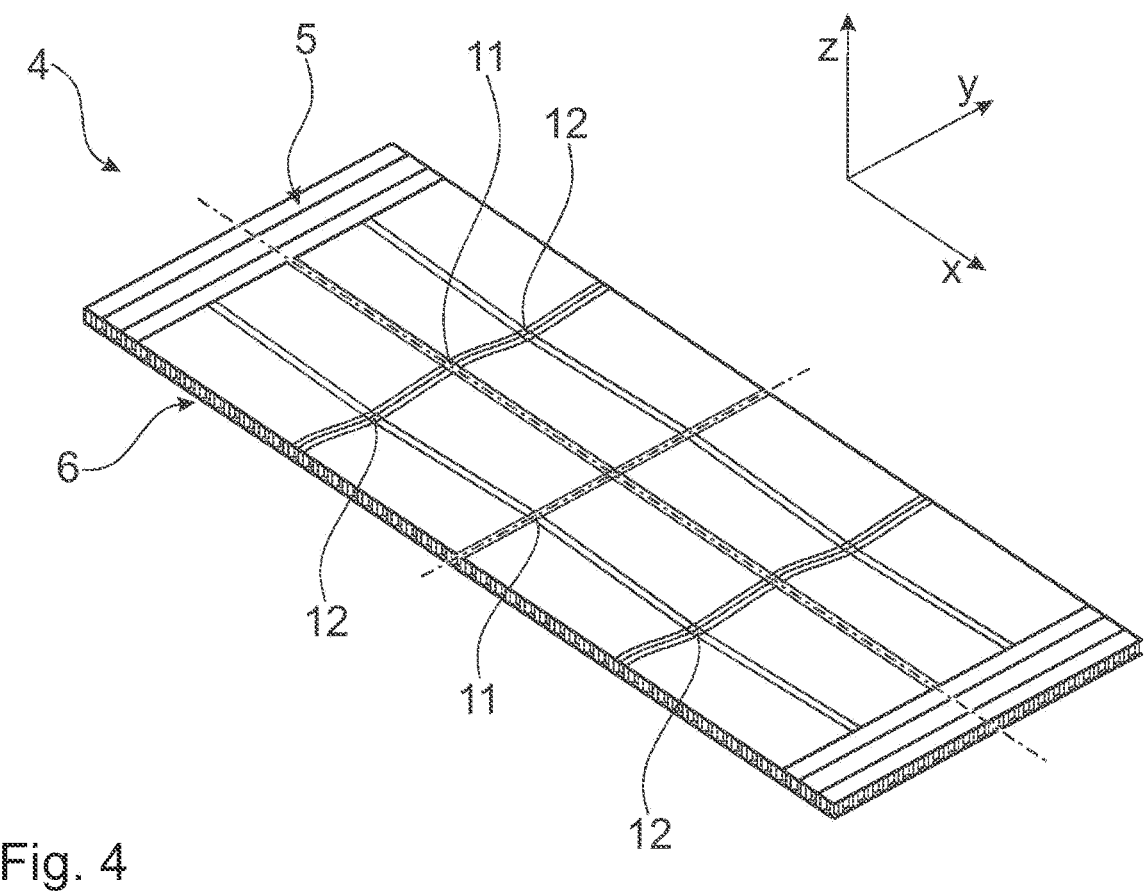
FIG. 4 a third embodiment of a protector.

FIG. 1 shows a battery structure 1 in an exploded view from below. FIGS. 2a and 2b schematically show an impact of an object 14 into a battery structure 1 from below. FIG. 3a through 3d show cross-section views of a first and a second variation of a protector 4 from the side along section line A-A. FIG. 4 shows a third variation of a protector 4 in a perspective view.

As shown in FIG. 1, the battery structure 1 comprises a battery case 2 for at least one battery module 3 and a protector 4. The elements are shown in a disassembled, exploded manner. The assembly is schematically indicated by dotted lines. As shown for example in FIG. 2a and FIG. 3, the protector 4 comprises a top belt 5 and a bottom belt 6 and a core 7 arranged between and interconnecting the top belt 5 and the bottom belt 6 at least in certain areas. In the shown variation, the core is a honeycomb, wherein the cells of the honeycomb extend in a vertical direction (i.e., z-direction). As schematically indicated in FIG. 1 the protector 4, namely the top belt 5, can be interconnected to a frame 10 of the battery case 2.

As shown in FIG. 2a, the top belt 5 of the illustrated variation has a wavelike cross-section. The top belts 5 are interconnected to longitudinal beams 8 of the battery case 2. The top belt 5 comprises elevations 11 and thereto alternating depressions 12 forming waves 13, which are arranged in a regular manner. The waves 13 are here extending in the x-direction only. Other arrangements are possible.

In the variation as shown in FIG. 2a, respectively the section view according to FIG. 3a, the top belt 5 in the area of the depressions 12 is directly interconnected to the bottom belt 6, which has an in principle flat design. As shown in the section view according to FIG. 3c, the top belt 5 can be alternatively or in addition in the area the depressions 1 2 indirectly connected to the bottom belt 6 via the core 7.

FIG. 3b shows a section view along section line A-A according to FIG. 3a, and FIG. 3d shows a section view along section line A-A according to FIG. 3c.

For better temperature control of the at least one battery module, the core 7 can be made from an isolating material such as foam. If appropriate at least one of the depressions 12 is used for conveying of a fluid for cooling and/or heating of the at least one battery module.

FIG. 4 shows a further variation of a protector 4 in a perspective view from above. The top belt 5 has a wave-structure extending in two directions (x, y) simultaneously. The bottom belt 6 (not shown in detail) has a flat design. Depending on the field of application, other possibilities exist. In an area where the longitudinal and the transverse beams 8, 9 connect (indicated by dashed lines) the top belt 5 has a flat design. Compared to the prior art, the dome-like depressions 12 offer very high stiffness and energy consumption capability especially in the case of punctual impact loads from below 8 (i.e., z-direction).

The words used in the specification are words of description rather than limitation, and it is understood that various changes may be made without departing from the spirit and scope of the invention.

We claim:

1. A protector for a battery case of an electric vehicle, the protector comprising
   i. a top belt
   ii. a bottom belt and
   iii. a core arranged between and interconnecting the top belt and the bottom belt, wherein
   b. the top belt has a wavelike cross section, and wherein the core has alternating thicker areas and thinner areas that correspond to the wavelike cross section of the top belt.

2. The protector according to claim 1, wherein the top belt has a waveform in at least one direction.

3. The protector according to claim 1, wherein the top belt has waves that extend in two directions.

4. The protector according to claim 1, wherein the top belt has waves that are regular or irregular.

5. The protector according to claim 1, wherein the top belt comprises elevations and thereto alternating depressions.

6. The protector according to claim 5, wherein the top belt in an area of at least one depression is directly interconnected to the bottom belt.

7. The protector according to claim 6, wherein the top belt in the area of the at least one depression is directly connected to the bottom belt.

8. The protector according to claim 5, wherein the top belt in the area of the at least one depression is indirectly connected to the bottom belt via the core.

9. The protector according to claim 1, wherein the top belt and the bottom belt and the core, are made from at least one out of the following group of materials: aluminum, steel, fiber reinforced composite material, thermoplastic material.

10. The protector according to claim 1, wherein the top belt is made from aluminum and/or steel and/or thermoplastic material comprising short fibers, and wherein the bottom belt is made from fiber reinforced composite material comprising continuous fibers.

11. The protector according to claim 1, wherein the core has a core material.

12. The protector according to claim 1, wherein the core is a honeycomb and/or a foam.

13. The protector according to claim 12, wherein the honeycomb is made from aluminum, steel or injection molded thermoplastic material.

14. The protector according to claim 1, wherein the core is made from an isolating material.

15. The protector according to claim 1, wherein the bottom belt has a flat structure.

16. The protector according to claim 15, wherein stiffening corrugations are applied as part of the structure and/or as separate elements.

17. The protector according to claim 5, wherein at least one of the depressions is used for conveying of a fluid for cooling and/or heating of at least one battery module.

18. The protector according to claim 3, wherein the top belt comprises dome-like depressions.

19. A battery structure for an electric vehicle comprising a battery case for at least one battery module and a protector according to claim 1.

20. The battery structure according to claim 19, wherein the top belt is interconnected to at least one longitudinal beam and/or at least one transversal beam of the battery case.

21. The battery structure according to claim 19, wherein the top belt is interconnected to a frame of the battery case.

22. The battery structure according to claim 20, wherein the top belt is interconnected to the at least one longitudinal beam and/or the at least one transversal beam and/or a frame of the battery case across a lower sled wall of the battery case.

23. The battery structure according to claim 19, wherein the protector is arranged below a lower sled wall of the battery case housing the at least one battery module inside.

* * * * *